(12) United States Patent
Ueda

(10) Patent No.: US 8,736,916 B2
(45) Date of Patent: May 27, 2014

(54) OPTICAL SCANNER THAT FORMS AN OPTICAL PATH FOR AN IMAGE LIGHT EMITTED FROM A LIGHT SOURCE, AND IMAGE FORMING APPARATUS ACCORDING TO AN ELECTROPHOTOGRAPHY METHOD WITH A PHOTORECEPTOR THAT UNDERGOES AN EXPOSURE TO AN IMAGE LIGHT FROM THE OPTICAL SCANNER

(75) Inventor: Atsushi Ueda, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 361 days.

(21) Appl. No.: 13/115,463

(22) Filed: May 25, 2011

(65) Prior Publication Data
US 2011/0292468 A1 Dec. 1, 2011

(30) Foreign Application Priority Data
May 25, 2010 (JP) .................................. 2010-119316

(51) Int. Cl.
*H04N 1/04* (2006.01)

(52) U.S. Cl.
USPC ......................................................... 358/474

(58) Field of Classification Search
None
See application file for complete search history.

(56) References Cited

U.S. PATENT DOCUMENTS

| 6,738,200 B2 * | 5/2004 | Handa et al. ................... 359/727 |
| 6,768,886 B2 * | 7/2004 | Nakazato et al. .............. 399/111 |
| 7,936,494 B2 * | 5/2011 | Itabashi ...................... 359/205.1 |
| 2004/0240000 A1 * | 12/2004 | Miyatake et al. ............. 358/474 |
| 2006/0164504 A1 | 7/2006 | Kobayashi et al. |
| 2007/0097454 A1 * | 5/2007 | Kim ................................. 358/474 |
| 2008/0218828 A1 * | 9/2008 | Serizawa ...................... 359/205 |

FOREIGN PATENT DOCUMENTS

| JP | 9-184963 | 7/1997 |
| JP | 10-026732 | 1/1998 |
| JP | 11-218708 | 8/1999 |
| JP | 2001-183573 | 7/2001 |
| JP | 2006-201626 | 8/2006 |
| JP | 2008-139353 | 6/2008 |

* cited by examiner

*Primary Examiner* — Jeremiah Bryar
(74) *Attorney, Agent, or Firm* — Nixon & Vanderhye, P.C.

(57) ABSTRACT

An optical scanner contains in a casing made of thermoplastic material a light source that emits an image light based on image data, and at least one optical element that is disposed in an optical path for the image light. The optical element is held through a holding member by the casing. The holding member is uprightly held at one edge portion thereof on an inside surface of the casing, and secures the optical element at the other edge portion thereof. The holding member has a shape that causes a thermal deformation in which a leaning direction of the other edge portion is opposite to a leaning direction of the one edge portion due to a thermal deformation of the inside surface of the casing when a temperature of the casing rises.

17 Claims, 14 Drawing Sheets

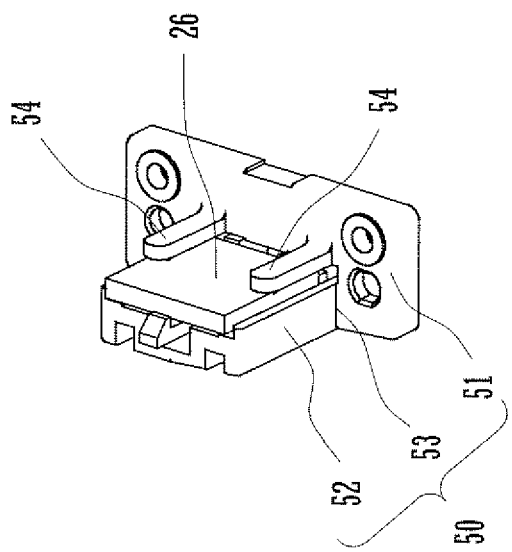
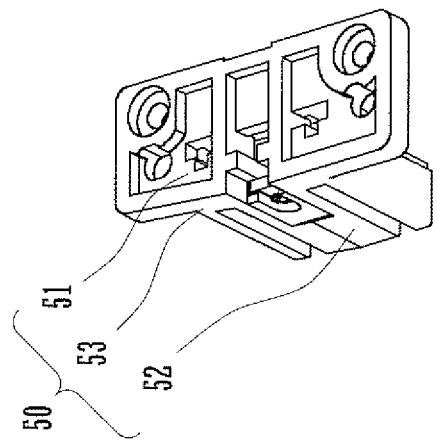

OPTICAL SCANNER THAT FORMS AN OPTICAL PATH FOR AN IMAGE LIGHT EMITTED FROM A LIGHT SOURCE, AND IMAGE FORMING APPARATUS ACCORDING TO AN ELECTROPHOTOGRAPHY METHOD WITH A PHOTORECEPTOR THAT UNDERGOES AN EXPOSURE TO AN IMAGE LIGHT FROM THE OPTICAL SCANNER

CROSS REFERENCE

This Nonprovisional application claims priority under 35 U.S.C. §119(a) on Patent Application No. 2010-119316 filed in Japan on May 25, 2010, the entire contents of which are hereby incorporated by reference.

BACKGROUND OF THE INVENTION

The present invention relates to an optical scanner that forms an optical path for an image light emitted from a light source, and to an image forming apparatus according to an electrophotography method such as a printer provided with a photoreceptor that undergoes an exposure to an image light from the optical scanner.

An image forming apparatus performing an image forming process according to the electrophotography method is provided with an optical scanner that causes a photoreceptor to be exposed to an image light. The optical scanner includes a light source, a scan means and an optical element. The light source emits an image light that is modulated by image data. The scan means scans the image light in a predetermined scan plane. The optical elements, which are lense(s) and mirror(s), include an incident optical element that deflects the image light emitted from the light source to lead to the scan means and an outgoing optical element that deflects at a uniform velocity the image light deflected at a constant angular velocity by the scan means to lead to the photoreceptor.

These light source, scan means and optical elements are housed in a casing with a shading property in order to prevent the image light from being affected by external light. In conventional optical scanners as disclosed in Japanese Patent Unexamined Publication No. 2001-183573 bulletin, for example, a casing made of resin molded components or the like, which is a thermoplastic material, has been used due to requirements for weight and cost reductions. The casing is provided with a plurality of support members integrally formed on its inside surface, and the support members support the light source, the scan means and the optical elements. The optical scanner forms, within the casing, an optical path for the image light from the light source by way of the incident optical element(s), the scan means and the outgoing optical element(s), wherefrom the light goes outside the casing.

Meanwhile, in an image forming process according to the electrophotography method, an exposure step, a development step, a transfer step and a fusing step are carried out sequentially in this order. The optical scanner forms an electrostatic latent image on the photoreceptor by subjecting it to an exposure to an image light in the exposure step. The electrostatic latent image is made visible as a toner image in the development step. The toner image is transferred onto paper in the transfer step. After the transfer step, the paper is heated and pressed in the fusing step, and thus the toner image is fixed on the paper.

For this purpose, the image forming apparatus according to the electrophotography method is equipped with a fuser unit that raises a surface temperature of the paper to a value higher than a fusing temperature of the toner. Because of the heat that the fuser unit generates at the time when an image forming process is performed, a temperature inside the image forming apparatus rises.

In addition, the image forming apparatus are provided with motors for supplying rotational motions to photoreceptor drums and conveyance rollers, along with a large number of electrical circuitry components such as driving circuit, control circuit and the like. Due in part to the heat from these motors and also the electrical circuitry components, the temperature inside the image forming apparatus rises.

However, when the temperature inside the image forming apparatus rises due to the heat from the motors, the electrical circuitry components and the fuser unit, deformation of the casing of the optical scanner made of resin, which is a thermoplastic material, occurs, thereby causing a mounting angle of an optical element that is supported through the support member by the inside surface of the casing to change (lean). Leaning of the optical element causes an error in an optical axis of the image light within the casing, and hence causes a deviation in exposure position of the image light on the photoreceptor; and thus image reproducibility deteriorates due to an error of an image position. In an optical scanner used for color image forming comprising a plurality of light emitting devices emitting image lights corresponding to the plurality of respective colors as light sources, errors occur in the exposure positions of the image lights of the respective colors on the photoreceptor due the leaning of the optical elements; and thus image reproducibility deteriorates due to changes in color tones in color images. Notably, leaning of the incident optical element causes a great amount of deviation of the exposure position.

The present invention is directed to providing a optical scanner that is capable of reducing the leaning of the optical elements in the casing, reducing an error in an optical axis of an image light, and thereby preventing the deterioration of image reproducibility, even when a thermal deformation occurred in a casing due to a temperature rise on an image forming process.

SUMMARY OF THE INVENTION

An optical scanner of the present invention contains in a casing made of thermoplastic material a light source that emits an image light based on image data, and at least one optical element that is disposed in an optical path for the image light. The optical element is held through a holding member by the casing. The holding member is uprightly held at one edge portion thereof on an inside surface of the casing, and secures the optical element at the other edge portion thereof. The holding member has a shape that causes a thermal deformation in which a leaning direction of the other edge portion is opposite to a leaning direction of the one edge portion due to a thermal deformation of the inside surface of the casing when a temperature of the casing rises.

BRIEF DESCRIPTION OF THE DRAWINGS

FIG. 6A and FIG. 6B are perspective views of a member constituting a holding member of the optical scanner from an upper side and a lower side, respectively.

DETAIL DESCRIPTION OF THE INVENTION

An image processing apparatus equipped with an optical scanner according to an embodiment of the present invention is explained below as an exemplar.

Figure 1:
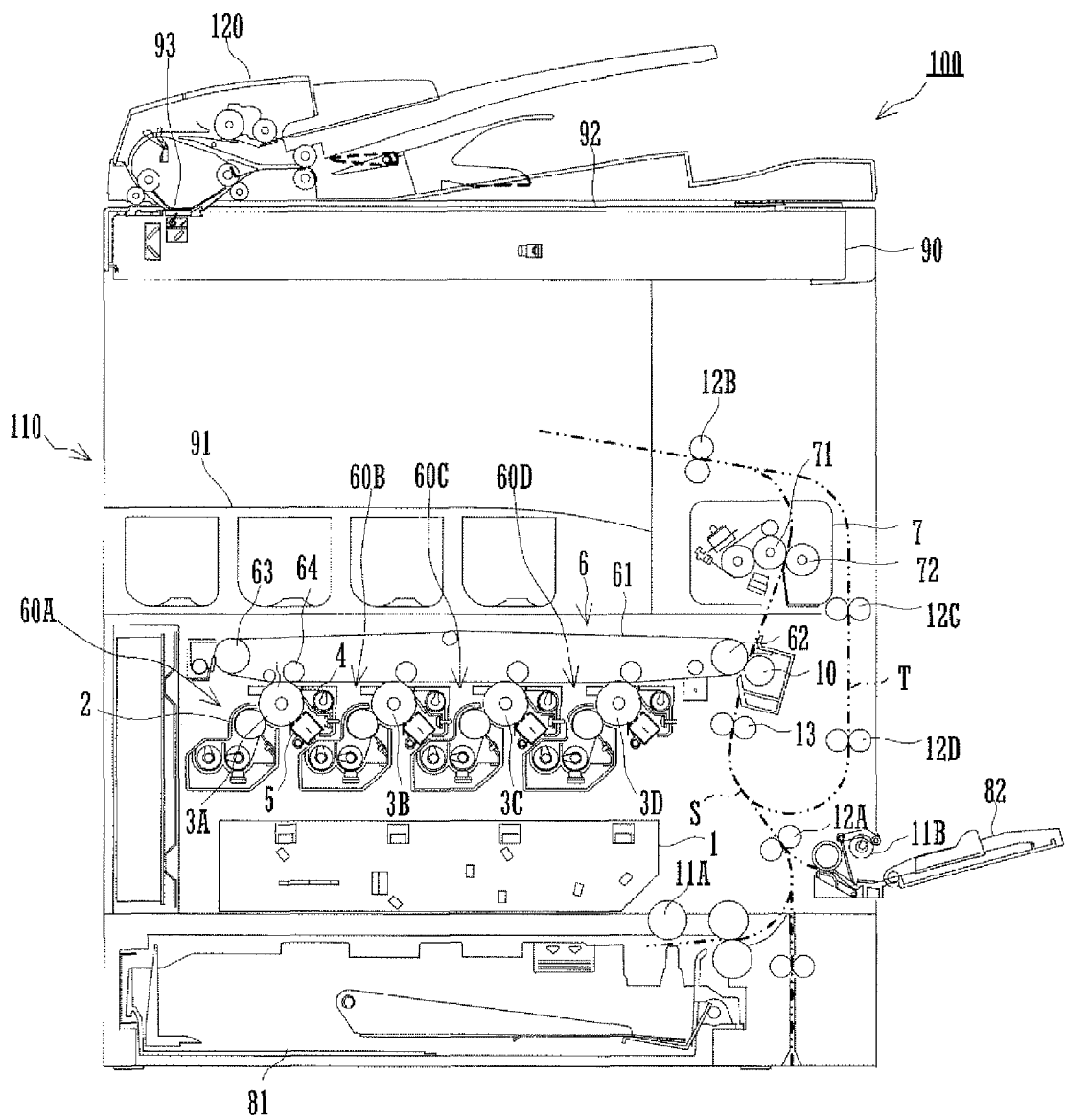
FIG. 1 is a schematic diagram of an image forming apparatus provided with an optical scanner according to an embodiment of the present invention.

As shown in FIG. 1, an image forming apparatus 100 provided with an optical scanner according to an embodiment of the present invention forms a multicolored or a monochromatic image onto a predetermined sheet (recording paper) based on image data.

To a top surface of a main body 110 are disposed document tables 92, 93 made of a transparent glass, and is attached an automatic document processing unit 120 so as to be swung freely around a supporting axis at a rear side edge thereof. The automatic document processing unit 120 conveys a document onto the document loading table 93 automatically. By turning the automatic document processing unit 120 to open the top surface of the main body 110, a document can be placed manually onto the document loading table 92.

The main body 110 is equipped with an optical scanner 1, image forming sections 60A through 60D, an intermediate transfer belt unit 6, a fuser unit 7, a paper feed cassette 81, a manual paper tray 82, a copy receiving tray 91 and so forth.

The image forming section 60A includes a developing device 2, a photoreceptor drum 3A, a cleaner unit 4 and an electrostatic charger 5. The electrostatic charger 5 charges a surface of the photoreceptor drum 3A uniformly at a predetermined electrostatic potential. Other than an electrostatic charger as shown in FIG. 1, a contact type electrostatic charger such as roller type or brush-shaped type may be used. The developing device 2 makes an electrostatic latent image that is formed on the surface of the photoreceptor drum 3A by an exposure thereof to an image light from the optical scanner 1 a manifest black toner image. The cleaner unit 4 collects the toner remaining on the surface of the photoreceptor drum 3.

The image forming sections 60B through 600 respectively having photoreceptor drums 3B through 3D are respectively configured in the same manner as the image forming section 60A. The developing devices 2 of the image forming sections 60B through 60D make electrostatic latent images formed on the surfaces of the photoreceptor drums 3B through 3D manifest toner images of cyan, magenta and yellow, respectively.

The optical scanner 1, based on image data inputted, exposes the respective photoreceptor drums 3A through 3D that are charged with electricity, thereby forming on the surfaces thereof electrostatic latent images corresponding to the image data.

The intermediate transfer belt unit 6 includes an intermediate transfer belt 61, a drive roller 62, an idle roller 63 and intermediate transfer rollers 64. As to the intermediate transfer rollers 64, four of them are installed in total corresponding to the respective image forming sections 60A through 60D.

The intermediate transfer belt 61, being an endless belt passing over the drive roller 62 and the idle roller 63 in a tensioned condition, moves circularly with the rotation of the drive roller 62. Between each of the intermediate transfer rollers 64 and each of the photoreceptor drums 3A through 3D is formed, across the intermediate transfer belt 61, a transfer electric field to transfer the toner image from each surface of the photoreceptor drums 3A through 3D onto the surface of the intermediate transfer belt 61. In full color image forming, four-colored toner images formed on the respective surfaces of the photoreceptor drums 3A thorough 3D are superimposed on the intermediate transfer belt 61.

The paper feed cassette 81 and the manual paper feed tray 82 receive paper prior to an image forming. The copy receiving tray 91 receives the paper having undergone an image forming. A paper conveying path S is formed extending from the paper feed cassette 81 and the manual paper feed tray 82 to in between the intermediate transfer belt 61 and a secondary transfer roller 10, and via inside of the fuser unit 7 as far as the copy receiving tray 91 is reached. In the paper conveying path S, pickup rollers 11A, 11B, a conveyance roller 12A, a paper stop roller 13 and a paper discharge roller 12B are disposed.

Paper contained in the paper feed cassette 81 and the manual paper feed tray 82 is sent out piece by piece by the pickup rollers 11A, 11B, and is led by the conveyance roller 12A and the paper stop roller 13 to a secondary transfer position between the intermediate transfer belt 61 and the secondary transfer roller 10. The secondary transfer roller 10 transfers toner images on the intermediate transfer belt 61 on the paper. The fuser unit 7 includes a heating roller 71 and a pressure roller 72. The toner image transferred onto the paper is heated and pressed while the paper passes the fuser unit 7, and is fixed fast on the surface of the paper.

The paper discharge roller 12B is configured so as to rotate in either way, i.e. forward or reverse direction. In double sided image forming in which images are formed on both sides of the paper, the paper discharge roller 12B reverses its rotational direction while clamping a rear edge of the paper to which an image has been formed only on a first face thereof, and then leads the paper to a secondary paper conveying path T. The paper, by conveyance rollers 12C, 12D in the secondary paper conveying path T, is conveyed in between the conveyance roller 12A and the paper stop roller 13 in the paper conveying path S, and is led to the secondary transfer position with a second face thereof toward the intermediate transfer roller 61 side. The paper to which images have been formed on both faces thereof is discharged to the copy receiving tray 91 by the paper discharge roller 12B rotating in forward direction.

Figure 2:
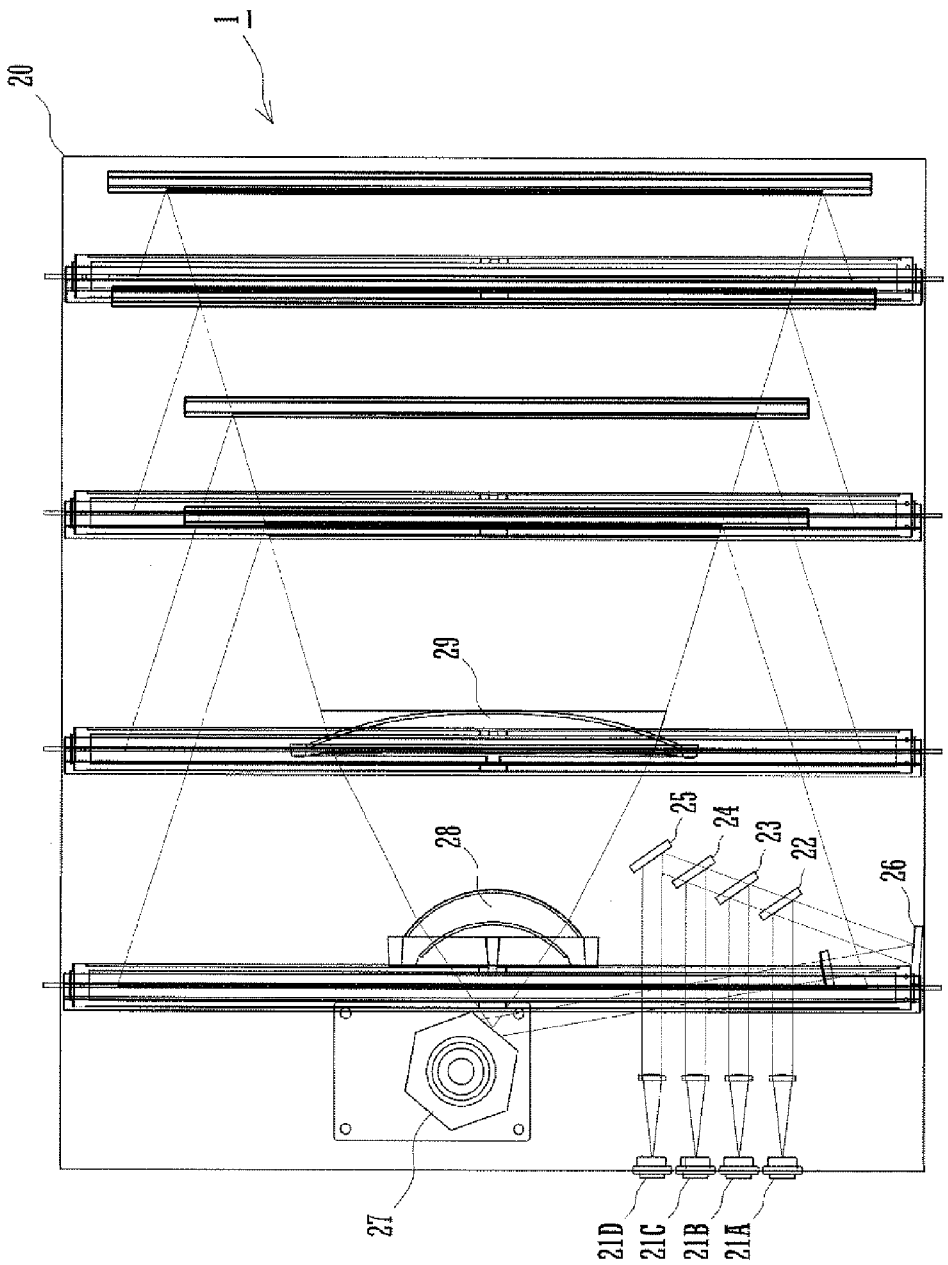
FIG. 2 is an internal top view of the optical scanner.
Figure 3:
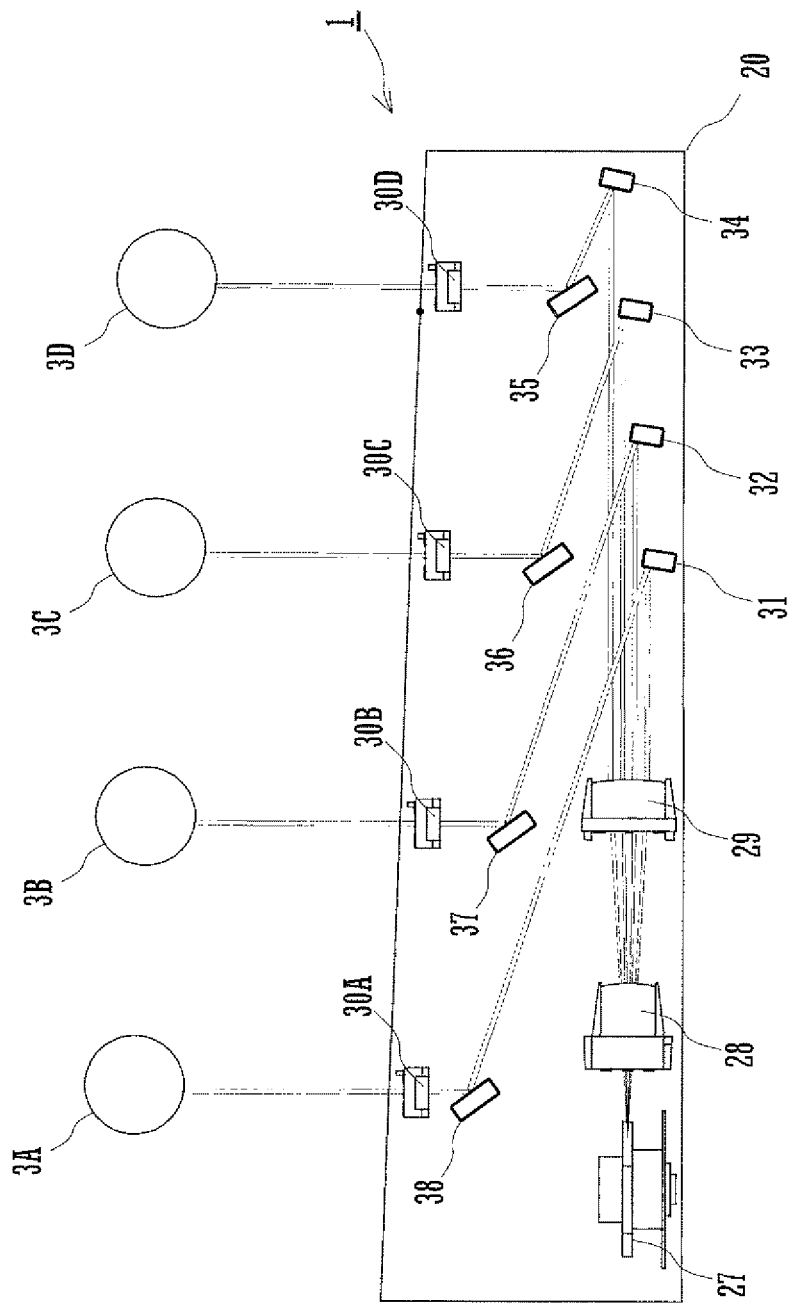
FIG. 3 is an internal front view of the optical scanner.
Figure 4:
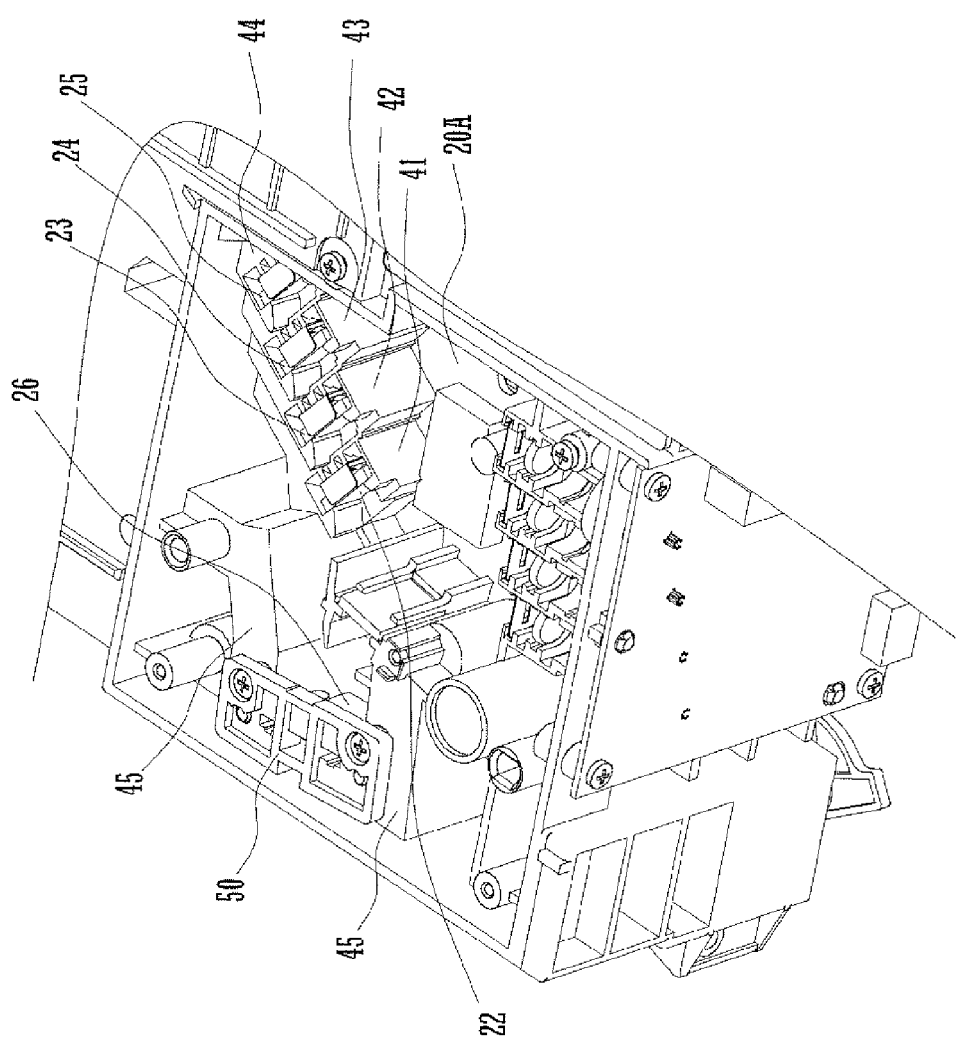
FIG. 4 is an external view of an essential part of the optical scanner.
Figure 5:
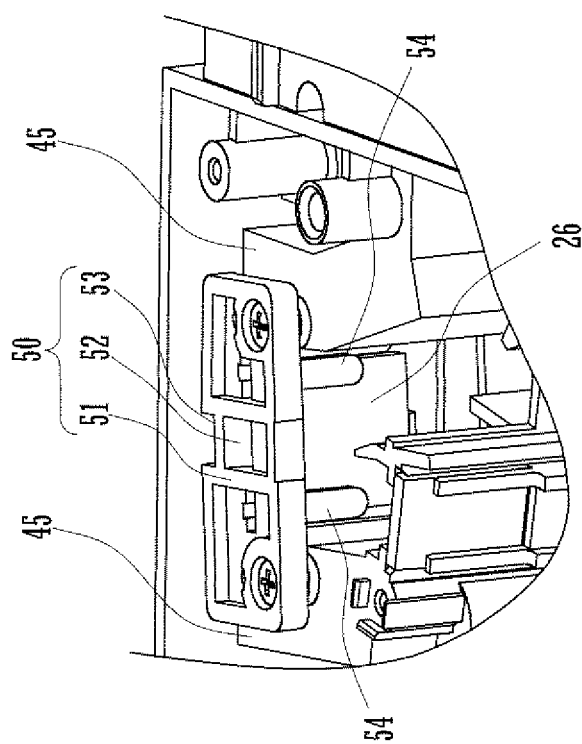
FIG. 5 is an external view of an essential part of the optical scanner from another direction.
Figure 7:
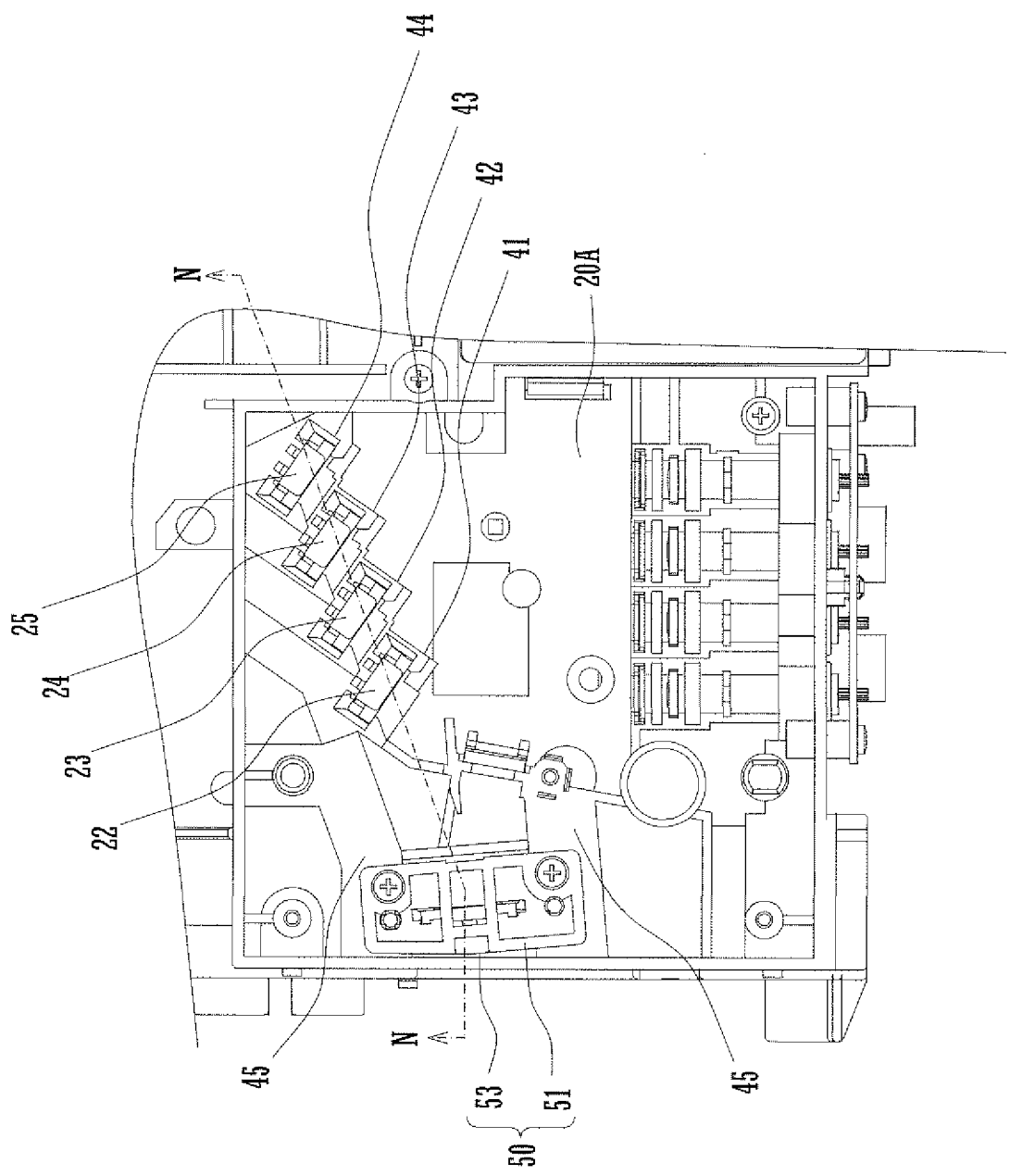
FIG. 7 is a top view of an essential part of the optical scanner.

The optical scanner 1, as shown in FIG. 2 and FIG. 3, contains in the casing 20, which is a molded component made of thermoplastic material, laser diodes 21A through 21D, mirrors 22 through 26, a polygonal mirror 27, a first to a third f-theta lenses 28, 29, 30A through 30O, and mirrors 31 through 38. The laser diodes 21A through 21D correspond to light emitting devices respectively constituting a light source of the present invention. The laser diodes 21A through 21D respectively correspond to the respective colors of black (K), cyan (C), magenta (M) and yellow (Y), and respectively emit image lights modulated by image data of the respective colors.

The mirrors 22 through 25 are reflection members and primary reflection elements of the present invention, and deflect the image lights that are emitted from the laser diode 21A through 21O toward the mirror 26. The mirror 26 is an optical element and a secondary reflection element of the present invention, and deflects the image lights that are deflected by the mirrors 22 through 25 toward the polygonal mirror 27. The mirrors 22 through 26 are disposed in between the laser diodes 21A through 21D and the polygonal mirror 27.

The polygonal mirror 27 corresponds to a scan means of the present invention, deflects the image lights at a constant angular velocity, and scans on a predetermined scan surface. For this purpose, the polygonal mirror 27 is provided with a plurality of reflective surfaces along its peripheral surface, and rotates at a constant rate in a predetermined direction.

The first f-theta lens 28 and the second f-theta lens 29 deflect at a uniform velocity the image lights that are deflected at the constant angular velocity by the polygonal mirror 27. The third f-theta lens 30, fixing shapes of the respective image lights, distributes the lights to the respective photoreceptor drums 3A through 3D outside the casing 20.

The mirrors 31 through 38, together with the first to the third f-theta lenses 28 through 30D, correspond to outgoing optical elements, and lead the respective image lights that are deflected by the first and the second f-theta lenses 28, 29 to the third f-theta lenses 30A through 30D, respectively.

In this manner, an optical path for the respective image lights emitted from the laser diodes 21A through 21D is formed inside the casing 20.

As shown in FIG. 4 through FIG. 8, the mirrors 22 through 26 respectively constituting an incident optical element are held inside the casing 20. For this purpose, holding sections 41 through 45 are integrally formed on an inside surface 20A of the casing 20 and uprightly held along the direction normal to the inside surface 20A of the casing 20. The mirrors 22 through 25 are primary reflection elements, and the mirror 26 is a secondary reflection element. The holding sections 41 through 44 respectively hold the mirrors 22 through 25. The holding section 45 holds the mirror 26 through a holding piece 50. Other than the holding sections 41 through 45, many holding sections to hold the polygonal mirror 27, the first to the third f-theta lenses 28 through 30O and mirrors 31 through 38 are also integrally formed on the inside surface 20A.

The holding piece 50 is a molded component made of thermoplastic material, and constitutes a holding member of the present invention together with the holding section 45. The holding section 45 corresponds to one edge portion of the present invention. The holding piece 50, having a L-shaped cross-section, is provided with an open edge portion (corresponding to the other edge portion of the present invention) 52 that is bent, for instance, at right angle at a bend 53 on the side of an edge of an attaching portion 51, and secures the mirror 26 at the open edge portion 52. The mirror 26 is gripped between the open edge portion 52 and a protrusion 54 projecting from the attaching portion 51. The holding piece 50 is screwed, at the attaching portion 51, to an edge of the holding section 45.

Figure 8:
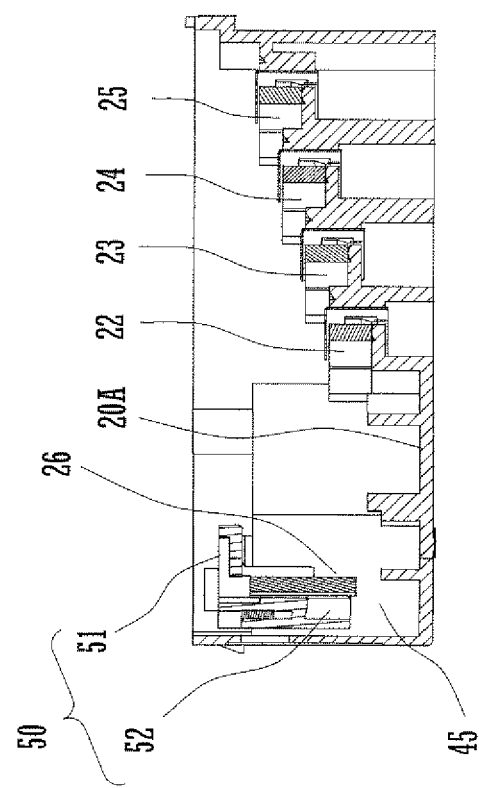
FIG. 8 is a sectional view at A-A line of FIG. 7.

Each of the holding sections 41 through 44 is formed so as to have a gradual increase in the amount of projection from the inside surface 20A in this order, and hence holds each of the mirrors 22 through 25 at a position different from each other in the direction normal to the inside surface 20A. That is, as shown in FIG. 8, the mirrors 22 through 25 are disposed stepwise in such a manner that the more distance to the mirror 26 results in the more separation from the inside surface 20A at each of a plurality of positions along a direction opposed to the mirror 26 on the inside surface 20A. The image lights reflected by the respective mirrors 22 through 25 are incident in parallel to mutually distinct positions on the single mirror 26 in the direction normal to the inside surface 20A. With the single mirror 26 reflecting, toward the polygonal mirror 27, the image lights that were reflected by the respective mirrors 22 through 25, parts count can be reduced, thereby allowing downsizing of the optical scanner 1.

The holding sections 41 through 44 respectively need to hold the respective mirrors 22 through 25 so that the image lights reflected by the mirrors 22 through 25 are incident on the mirror 26. On the other hand, the holding section 45 needs to hold the mirror 26 so that the image lights reflected by the mirror 26 are incident on the reflective surface of the polygonal mirror 27. For this purpose, the holding sections 41 through 44 are disposed so as to be opposed to the holding section 45 at a predetermined angle with the holding section 45 and at predetermined distances from the holding section 45.

At the time when the image forming process is performed in the image forming apparatus 100, because of the heat generated by the fuser unit 7, the motors and the electrical circuitry components, the temperature inside the casing 20 of the optical scanner 1 rises together with the temperature inside the image forming apparatus 100. It is known that a temperature rise at the time of the image forming process causes the inside surface 20A of the casing 20 comprising many holding sections a thermal deformation in which the casing 20 becomes convexed inwards. When a thermal deformation occurs such that the inside surface 20A of the casing 20 becomes convexed inwards, two members uprightly held at a predetermined distance between each other from the inside surface 20A are caused to lean toward directions away from each other.

Figure 9A:
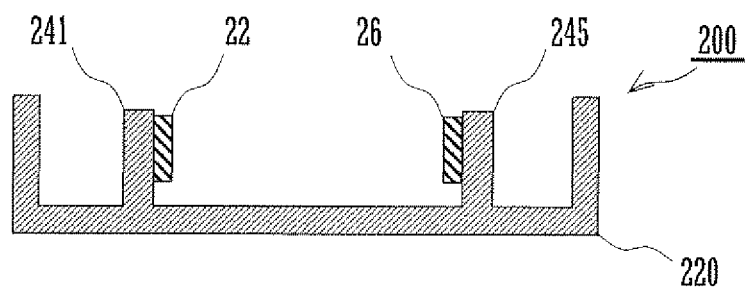
FIG. 9A and FIG. 9B are schematic diagrams showing states of an essential part of a conventional optical scanner at an ordinary temperature and at a high temperature, respectively.
Figure 9B:
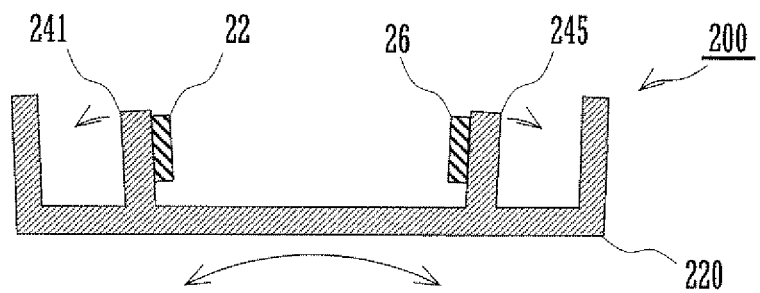

For example, in a conventional optical scanner 200 in which mirrors 22, 26 are fixed on respectively opposed surfaces of holding sections 241, 245 as shown in FIG. 9A, when the temperature of a casing 220 rises, reflective surfaces of the mirrors 22, 26 lean toward opposite directions each other integrally together with the holding sections 241, 245 as shown in FIG. 9B. Each of the image lights, after an error having been introduced in its direction of reflection by the leaning of the reflective surface of the mirror 22, is led to the polygonal mirror 27 with an error in the direction of reflection further increased by the leaning of the reflective surface of the mirror 26. Because of the leaning of the reflective surfaces of the mirrors 22, 26, an incident angle and an incident position of the respective image lights on the polygonal mirror 27 deviate as shown in FIG. 11A. The leaning occurs similarly also in relationships between the mirror 26 and mirrors 23 through 25 with different angle(s), causes errors in exposure positions of the image lights on the photoreceptor drums 3A through 3D, thereby causing errors in image positions on paper and color deviation of a color image, and thus resulting in deterioration of image reproducibility.

Figure 10A:
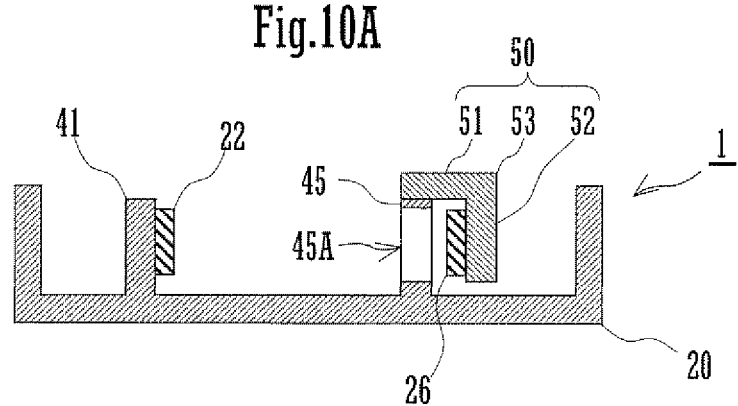
FIG. 10A and FIG. 10B are schematic diagrams showing states of an essential part of the optical scanner according to the embodiment of the present invention at an ordinary temperature and at a high temperature, respectively.

Then, in the present invention, as shown in FIG. 10A, the mirror 26 is held through the holding piece 50 by the holding section 45 that is uprightly held on the inside surface 20A. In other words, in the optical scanner 1, the holding member of the present invention is configured by two pieces of a division, i.e. the attaching portion (corresponding to an intermediate portion of the present invention) 51 extending across the bend 53 to the holding section (corresponding to one edge portion of the present invention) 45 that is integrally formed on the inside surface 20A, and the open edge portion (corresponding to the other edge portion of the present invention) 52. In addition, an opening 45A is formed in the holding section 45 so as to ensure incidence and reflection of the lights on the mirror 26.

It is empirically known that a resin molded component having a bent in between both edges is generally caused to deform in directions such that the both ends get away from each other as the temperature rises.

Figure 10B:
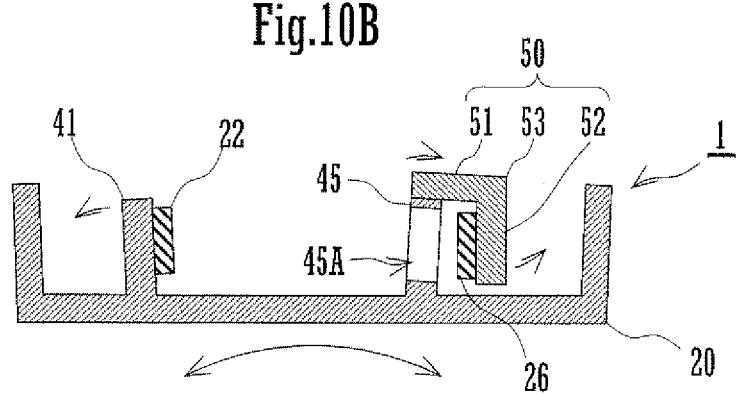

As shown in FIG. 10B, when a thermal deformation occurs in which the inside surface 20A becomes convexed inwardly due to a temperature rise of the casing 20, the holding section 45 is caused to lean toward a direction such that the holding section 45 gets away from the holding section 41. At the same time, the holding piece 50 is also caused to lean toward a direction such that the open edge portion 52 gets away from the attaching portion 51 due to a temperature rise. The leaning direction of the open edge portion 52 is opposite to the leaning direction of the holding section 45 with respect to the inside surface 20A of the casing 20. That is to say, the reflective surface of the mirror 26 leans toward the same direction as the direction to which the reflective surface of the mirror 22 leans. Thereby, each of the image lights, after an error having been introduced in its direction of reflection by the leaning of the reflective n surface of the mirror 22, is led to the polygonal mirror 27 with an error in the direction of reflection barely increased by the leaning of the reflective surface of the mirror 26. Thereby, as shown in FIG. 11B, errors in the incident angle and the incident position of each of the image lights deflected by the mirrors 41 though 44 on the reflective surface of the polygonal mirror 27 can be reduced.

Figure 11B:
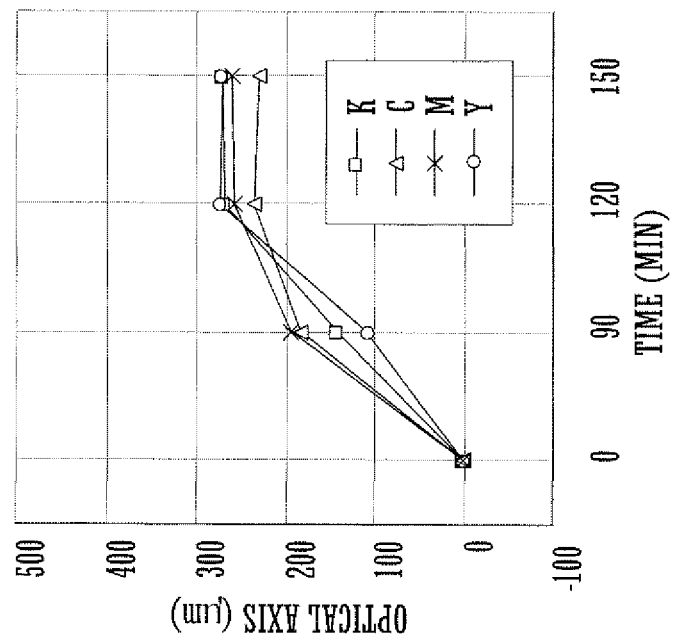
FIG. 11B is a diagram showing a result of measurement on an exposure position in the optical scanner according to the embodiment of the present invention at a high temperature.
Figure 11A:
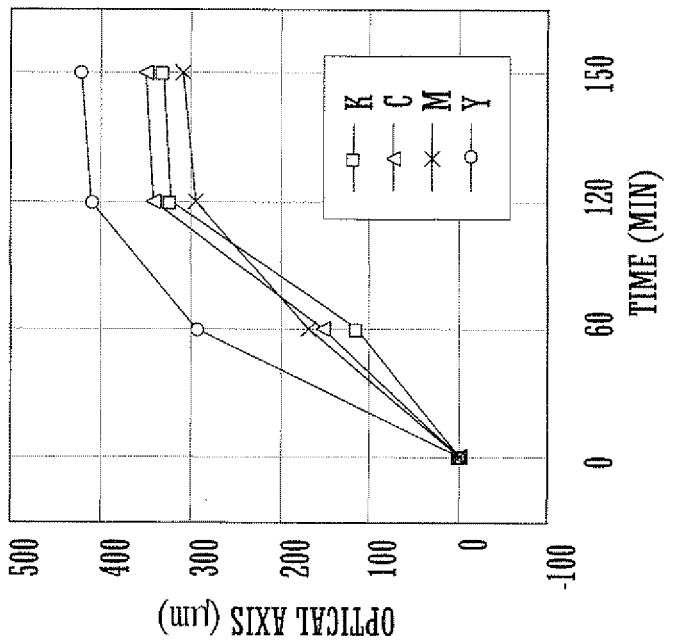
FIG. 11A is a diagram showing a result of measurement on an exposure position in the conventional optical scanner at a high temperature.
Figure 12:
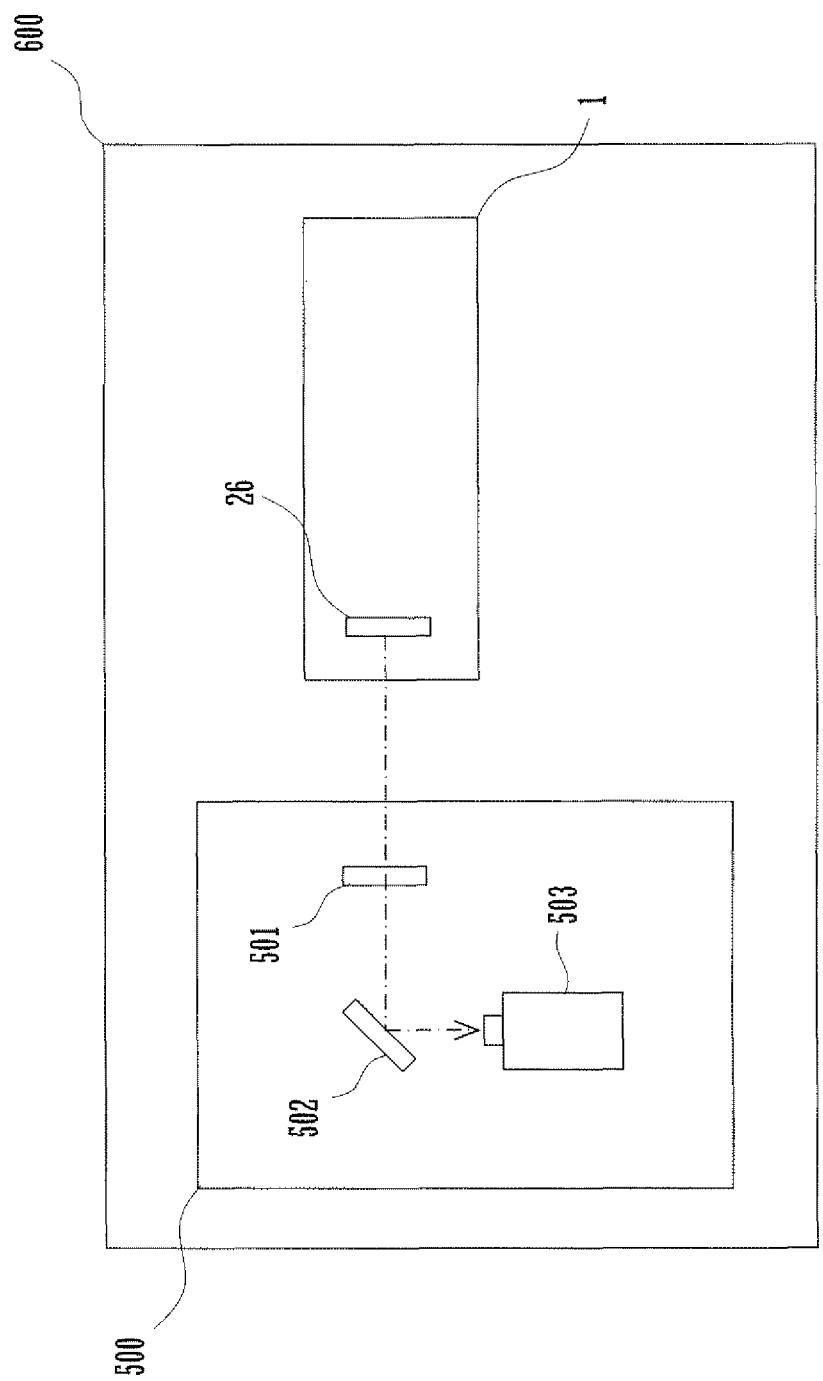
FIG. 12 is a drawing showing a configuration of a device used for the measurement of the exposure position.

Here, an apparatus as shown in FIG. 12 was used in obtaining the results of measurement on the exposure position shown in FIG. 11A and FIG. 11B. An optical scanner 1 was contained in a thermostatic oven 600 together with an optical axis inspection fixture 500. The optical scanner 1 is one from which outgoing optical elements, which include and are positioned further than the polygonal mirror 27, were removed. The optical scanner 1 projects the lights that are deflected by the mirror 26, which is an incident optical element, on a half mirror 501. The optical axis inspection fixture 500 is equipped with the half mirror 501, a reflecting mirror 502 and a camera 503. The half mirror 501 is positioned such that a distance to an incident surface thereof from the mirror 26 is equal to a distance from the mirror 26 the incident position on the deflective surface of the polygonal mirror 27 in an optical scanner 1. On the incident surface of the half mirror 501 is indicated a standard incident position. The camera 503 takes a pick-up of an image on the incident surface of the half mirror 501 reflected by the reflecting mirror 502.

With this configuration, the deflective surface of the polygonal mirror 27 in an optical scanner 1 is replaced by the half mirror 501; thereby it is made possible to measure a deviation of an optical axis on a deflective surface of a polygonal mirror 27 from the image on the incident surface of the half mirror 501 the image on which is taken a pick-up of by the camera 503.

In this measurement, first, the interior of the thermostatic oven 600 was conditioned to a normal temperature and normal humidity state (20 degrees Celsius, humidity 35%), and an optical axis of a light of the optical scanner 1 was adjusted to a central position of the standard incident position on the incident surface of the half mirror 501. After that, the interior temperature of the thermostatic oven 600 was controlled at a temperature of an operating environment of the image forming apparatus 100, i.e. at 60 degrees Celsius taking the temperature rise due to the heat from the fuser unit, the motors and the electrical circuitry components into account, while the interior humidity of the thermostatic oven 600 was controlled at 90% in consideration of an upper limit for the actual operating environment of the optical scanner 1; and then measurement was made for a deviation of the optical axis from the standard incident position after the passage of 60 minutes, 120 minutes and 150 minutes, respectively.

As a result, an improvement to a maximum of 100 µm was observed with the optical scanner 1. As the miniaturization of the optical scanner 1 advances with the miniaturization of the image forming apparatus 100, the deflective surface of the polygonal mirror 27 is made thin to a working width of around 1.8 mm. From design view point, since the optical axis is to project the lights to a center of the thickness direction, the working width has only plus minus 0.9 mm left; so that an improvement of 0.1 mm in deviation is significant in effect.

The holding sections 41 through 44 may be formed in a shape that is similar to the holding section 45. Thereby, it is possible to further reduce errors in the exposure angle and the exposure position of the respective image lights on the reflective surface of the polygonal mirror 27.

Figure 13A:
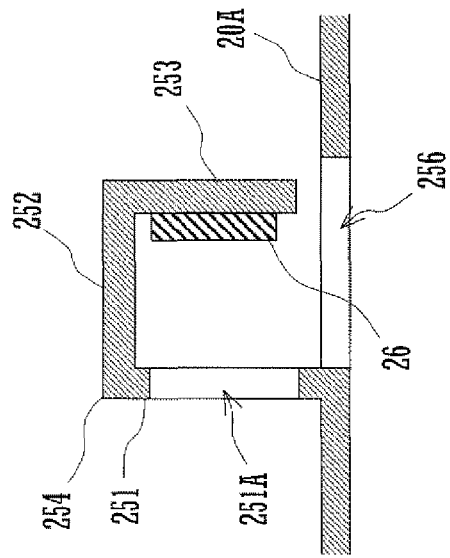
FIGS. 13A through 13D are sectional views of an essential part of an optical scanner according to other embodiments of the present invention.
Figure 13B:
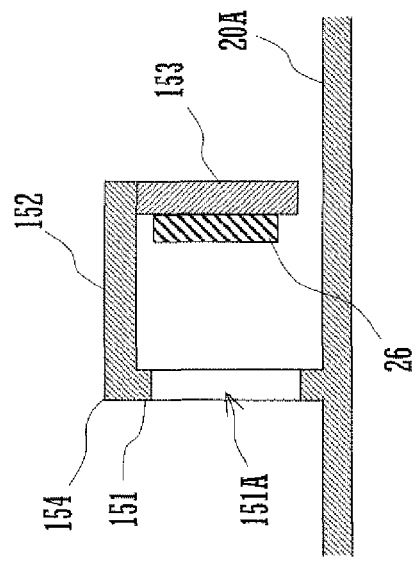

Further, the holding member(s) of the present invention may, as shown in FIG. 13A, be such that a root edge portion (corresponding to one edge portion of the present invention) 151 uprightly held on the inside surface 20A and an intermediate portion 152 are, sandwiching a bend 154, integrally formed on the inside surface 20A, and that an open edge portion 153 is attached to the intermediate portion 152.

Alternatively, as shown in FIG. 135, the holding member(s) of the present invention may be such that bends 254, 255 are formed in between a root edge portion 251 and an intermediate portion 252, in between an open edge portion 253 and the intermediate portion 252 respectively, and integrally to a U-shaped cross-section on the inside surface 20A. In this case, it is necessary to provide an opening 256 in the inside surface 20A for die removal in resin molding.

Figure 13C:
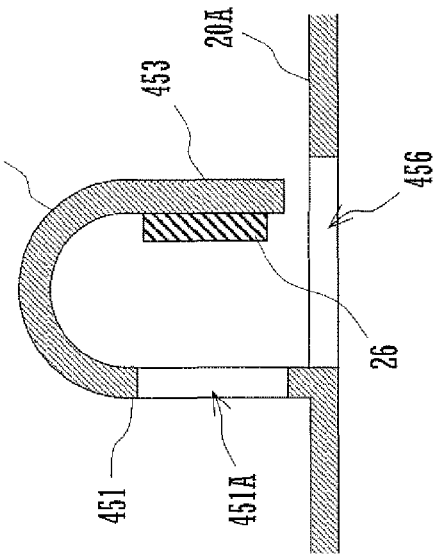

Moreover, as shown in FIG. 13C, the holding member(s) of the present invention may be such that a root edge portion 351 is integrally formed on the inside surface 20A, that a component is formed sandwiching a curved portion 354 in between an intermediate portion 352 and an open edge portion 353, and that an edge portion of opposite side to the curved portion 354 of the intermediate portion 352 of the component is attached to the root edge portion 351. Or, in the example shown in FIG. 13A, a curved portion may be formed instead of the bend 154.

Figure 13D:
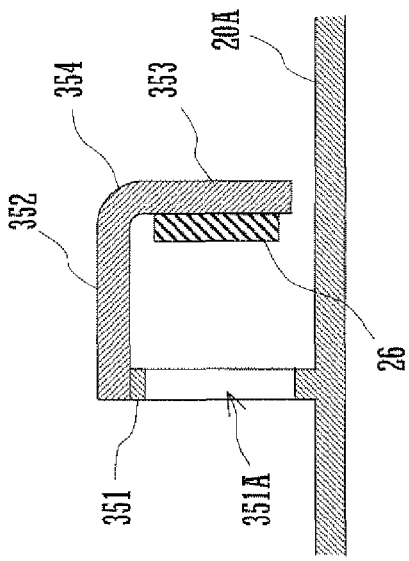

Additionally, as shown in FIG. 13D, the holding member (s) of the present invention may be such that an entire intermediate portion 452 between an root edge portion 451 and an open edge portion 453 is made a curved portion and integrally formed on the inside surface 20A. In this case, it is also necessary to provide an opening 456 in the inside surface 20A for die removal in resin molding.

In these cases also, openings 151A, 251A, 351A, 451A are formed respectively in the root edge portions 151, 251, 351, 451 so as to ensure incidence and reflection of the lights on the mirror 26.

Figure 14A:
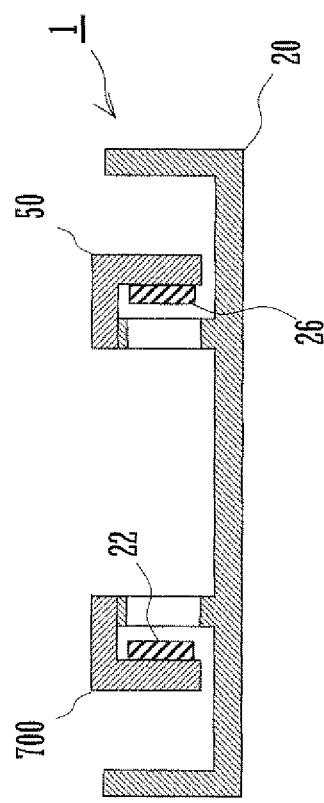
FIGS. 14A and 14B are sectional views of an essential part of an optical scanner according to still other embodiment of the present invention.

Besides, as shown in FIG. 14A, it is also possible to dispose a holding piece 700 of a shape similar to the holding piece 50 opposed to the holding piece 50, and to cause the holding piece 700 to hold the mirror 22. By this means, it is made possible to decrease an angle of leaning of the reflective surface of the mirror 22 due to a temperature rise of the optical scanner 1, and hence to further reduce the deviation of the optical axes of the image lights.

Figure 14B:
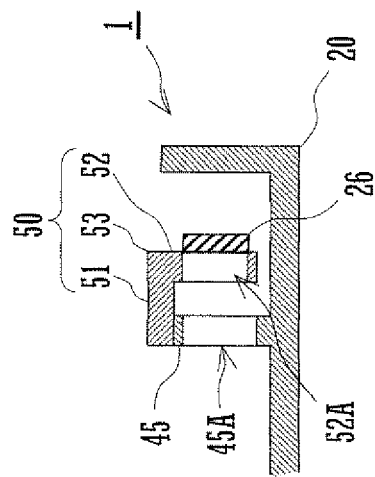

Further still, as shown in FIG. 14B, in either of the aforementioned examples, the mirror 26 may be installed on an outside surface of the open edge portion 52 of the holding piece 5. In this case, an opening 52A that is smaller than the mirror 26 with respect to either height or width is formed in the open edge portion 52.

An optical element that a holding, member of the present invention holds or is to hold is not limited to a mirror, but is regardless of whether it is an incident optical element or an outgoing optical element.

The above explanation of the embodiments is nothing more than illustrative in any respect, nor should be thought of as restrictive. Scope of the present invention is indicated by claims rather than the above embodiments. Further, is intended that all changes that are equivalent to a claim in the sense and realm of the doctrine of equivalence be included within the scope of the present invention.

What is claimed is:

1. An optical scanner comprising:
a light source for emitting an image light based on image data;
an optical element disposed in an optical path of the image light emitted by the light source; and
a casing for containing the light source and the optical element, wherein
the casing comprising thermoplastic material, the casing further comprising a holding member comprising thermoplastic material with a first edge portion thereof uprightly held on an inside surface of the casing and a second edge portion thereof for holding the optical element, wherein
the holding member has a shape that causes a thermal deformation due to a temperature rise of the casing in such a manner that a leaning direction of the second edge portion is opposite to a leaning direction of the first edge portion by a thermal deformation of the inside surface.

2. The optical scanner as claimed in claim 1 wherein the holding member comprises an intermediate portion disposed between the first edge portion and the second edge portion, the first edge portion extends toward a direction at right angle with the inside surface, and the holding member has a U-shaped cross section with each of both ends of the intermediate portion extending respectively across a bend to the first edge portion and the second edge portion.

3. The optical scanner as claimed in claim 2 further comprising in the optical path a scan means for scanning the image light by a scan surface thereof, wherein
the optical element that the holding member holds is disposed between the light source and the scan means.

4. The optical scanner as claimed in claim 3 comprising in the optical path a plurality of reflection members for deflecting the image light emitted by the light source toward the optical element, wherein
reflective surfaces of the plurality of reflection members are opposed to one another.

5. The optical scanner as claimed in claim 4 comprising a plurality of light emitting devices, wherein
the optical element includes:
a plurality of primary reflection elements for reflecting respective image lights emitted from the plurality of light emitting devices; and
a single secondary reflection element for reflecting the image lights reflected by the plurality of primary reflection elements,
the plurality of primary reflection elements being disposed stepwise in such a manner that the more distance to the secondary reflection element results in the more separation from the inside surface at each of a plurality of positions along a direction opposed to the secondary reflection element on the inside surface,
the secondary reflection element being held by the holding member.

6. The optical scanner as claimed in claim 3 comprising a plurality of light emitting devices, wherein
the optical element includes:
a plurality of primary reflection elements for reflecting respective image lights emitted from the plurality of light emitting devices; and
a single secondary reflection element for reflecting the image lights reflected by the plurality of primary reflection elements,
the plurality of primary reflection elements being disposed stepwise in such a manner that the more distance to the secondary reflection element results in the more separation from the inside surface at each of a plurality of positions along a direction opposed to the secondary reflection element on the inside surface,
the secondary reflection element being held by the holding member.

7. The optical scanner as claimed in claim 2 comprising in the optical path a plurality of reflection members for deflecting the image light emitted by the light source toward the optical element, wherein
reflective surfaces of the plurality of reflection members are opposed to one another.

8. The optical scanner as claimed in claim 7 comprising a plurality of light emitting devices, wherein
the optical element includes:
a plurality of primary reflection elements for reflecting respective image lights emitted from the plurality of light emitting devices; and
a single secondary reflection element for reflecting the image lights reflected by the plurality of primary reflection elements,
the plurality of primary reflection elements being disposed stepwise in such a manner that the more distance to the secondary reflection element results in the more separation from the inside surface at each of a plurality of positions along a direction opposed to the secondary reflection element on the inside surface,
the secondary reflection element being held by the holding member.

9. The optical scanner as claimed in claim 2 comprising a plurality of light emitting devices, wherein
the optical element includes:
a plurality of primary reflection elements for reflecting respective image lights emitted from the plurality of light emitting devices; and
a single secondary reflection element for reflecting the image lights reflected by the plurality of primary reflection elements,
the plurality of primary reflection elements being disposed stepwise in such a manner that the more distance to the secondary reflection element results in the more separation from the inside surface at each of a plurality of positions along a direction opposed to the secondary reflection element on the inside surface, the secondary reflection element being held by the holding member.

10. The optical scanner as claimed in claim 1 further comprising in the optical path a scan means for scanning the image light by a scan surface thereof, wherein
the optical element that the holding member holds is disposed between the light source and the scan means.

11. The optical scanner as claimed in claim 10 comprising in the optical path a plurality of reflection members for deflecting the image light emitted by the light source toward the optical element, wherein
reflective surfaces of the plurality of reflection members are opposed to one another.

12. The optical scanner as claimed in claim 11 comprising a plurality of light emitting devices, wherein
the optical element includes:
a plurality of primary reflection elements for reflecting respective image lights emitted from the plurality of light emitting devices; and
a single secondary reflection element for reflecting the image lights reflected by the plurality of primary reflection elements,
the plurality of primary reflection elements being disposed stepwise in such a manner that the more distance to the secondary reflection element results in the more separation from the inside surface at each of a plurality of positions along a direction opposed to the secondary reflection element on the inside surface,
the secondary reflection element being held by the holding member.

13. The optical scanner as claimed in claim 10 comprising a plurality of light emitting devices, wherein
the optical element includes:
a plurality of primary reflection elements for reflecting respective image lights emitted from the plurality of light emitting devices; and
a single secondary reflection element for reflecting the image lights reflected by the plurality of primary reflection elements,
the plurality of primary reflection elements being disposed stepwise in such a manner that the more distance to the secondary reflection element results in the more separation from the inside surface at each of a plurality of positions along a direction opposed to the secondary reflection element on the inside surface,
the secondary reflection element being held by the holding member.

14. The optical scanner as claimed in claim 1 comprising in the optical path a plurality of reflection members for deflecting the image light emitted by the light source toward the optical element, wherein
reflective surfaces of the plurality of reflection members are opposed to one another.

15. The optical scanner as claimed in claim 14 comprising a plurality of light emitting devices, wherein
the optical element includes:
a plurality of primary reflection elements for reflecting respective image lights emitted from the plurality of light emitting devices; and
a single secondary reflection element for reflecting the image lights reflected by the plurality of primary reflection elements,
the plurality of primary reflection elements being disposed stepwise in such a manner that the more distance to the secondary reflection element results in the more separation from the inside surface at each of a plurality of positions along a direction opposed to the secondary reflection element on the inside surface,
the secondary reflection element being held by the holding member.

16. The optical scanner as claimed in claim 1 comprising a plurality of light emitting devices, wherein
the optical element includes:
a plurality of primary reflection elements for reflecting respective image lights emitted from the plurality of light emitting devices; and
a single secondary reflection element for reflecting the image lights reflected by the plurality of primary reflection elements,
the plurality of primary reflection elements being disposed stepwise in such a manner that the more distance to the secondary reflection element results in the more separation from the inside surface at each of a plurality of positions along a direction opposed to the secondary reflection element on the inside surface,
the secondary reflection element being held by the holding member.

17. An image forming apparatus for performing an image forming according to an electrophotography method, the apparatus comprising:
an optical scanner as claimed in claim 1, and
a latent image bearing body that receives irradiation of an image light from the optical scanner.

* * * * *